United States Patent [19]

Will

[11] Patent Number: 5,129,087
[45] Date of Patent: Jul. 7, 1992

[54] COMPUTER SYSTEM AND A METHOD OF MONITORING TRANSIENT DATA STRUCTURES IN A COMPUTER SYSTEM

[75] Inventor: Robert C. Will, Vestal, N.Y.

[73] Assignee: International Business Machines, Corp., Armonk, N.Y.

[21] Appl. No.: 151,808

[22] Filed: Feb. 3, 1988

[51] Int. Cl.[5] .............................................. G06F 9/46
[52] U.S. Cl. ............... 395/650; 364/DIG. 1; 364/281.7; 364/281.6; 364/264.7
[58] Field of Search ... 364/200 MS File, 900 MS File

[56] References Cited

U.S. PATENT DOCUMENTS

| | | | |
|---|---|---|---|
| 3,528,062 | 9/1970 | Lehman et al. | 364/200 |
| 3,577,185 | 5/1971 | Belady | 364/200 |
| 3,611,307 | 10/1971 | Podvin et al. | 364/200 |
| 3,787,673 | 1/1974 | Watson et al. | 364/200 |
| 4,044,334 | 8/1977 | Bachman et al. | 364/200 |
| 4,084,224 | 4/1978 | Appell et al. | 364/200 |
| 4,084,228 | 4/1978 | Dufond et al. | 364/200 |
| 4,104,718 | 8/1978 | Poublen et al. | 364/200 |
| 4,177,510 | 12/1979 | Appell et al. | 364/200 |
| 4,274,138 | 6/1981 | Shimokawa | 364/200 |
| 4,366,537 | 12/1982 | Heller et al. | 364/200 |
| 4,403,288 | 9/1983 | Christian et al. | 364/200 |
| 4,453,213 | 6/1984 | Romagosa | 364/200 |
| 4,456,958 | 6/1984 | DeSantis et al. | 364/200 |
| 4,554,626 | 11/1985 | Katz et al. | 364/200 |
| 4,564,903 | 1/1986 | Guyette et al. | 364/300 |
| 4,663,709 | 5/1987 | Fujiwara et al. | 364/200 |
| 4,674,038 | 6/1987 | Brelsford et al. | 364/200 |

FOREIGN PATENT DOCUMENTS

| | | |
|---|---|---|
| 052713 | 6/1982 | European Pat. Off. . |
| 194662 | 9/1986 | European Pat. Off. . |

OTHER PUBLICATIONS

IBM Technical Disclosure Bulletin, vol. 16, No. 5, Oct. 1973, "Serial Cross Memory Post," J. A. Cannavino, et al.

IBM Technical Disclosure Bulletin, vol. 24, No. 3, Aug. 1981, "Cross Memory Local Storage Option," G. J. Ferdinand, et al.

IBM Technical Disclosure Bulletin, vol. 28, No. 8, Jan. 1986, "Application/Subsystem Conversation Interface Using Synchronization Timers".

Primary Examiner—Gareth O. Shaw
Assistant Examiner—Kakali Chaki
Attorney, Agent, or Firm—Scully, Scott, Murphy & Presser

[57] ABSTRACT

A method and system of monitoring data structures in a computer system. A control block is established when a user obtains access to the computer system and is released when the user releases access to the computer system. A control program is provided to control operation of the computer system, and the control program has a plurality of process modules to service the control blocks. The method comprises the steps of invoking one process module to service one control block, and temporarily suspending operation of that one process module and invoking another process module to control operation of the computer system. A monitoring unit is established to indicate whether that one control block remains established. When control of the computer system is passed from the other process module back to said one process module, the monitoring unit is searched to determine whether the one control block is still established. If that control block is still established, operation of the interrupted process module is resumed; however, if the one control block is not still established, control of the computer system is passed from the one process module to the control program.

15 Claims, 7 Drawing Sheets

COMPUTER SYSTEM AND A METHOD OF MONITORING TRANSIENT DATA STRUCTURES IN A COMPUTER SYSTEM

BACKGROUND OF THE INVENTION

This invention generally relates to computer systems, and more particularly to a system and method for controlling computer processes in a multiprogramming/multiprocessing environment.

In a multiprogramming/multiprocessing environment, multiple users are simultaneously employing a single computer system; and in such a system, multiple processes compete for resources within the computer system. Each process consists of a program—that is, an ordered collection of instructions and other data associated with the instructions—which is executed by the computer and operates on data to perform a user's job or some phase of that job. Where many such processes are demanding simultaneous attention from the system, the task of communicating with and between such processes and the task of controlling and allocating resources to such processes become extremely complex; and usually, a main, control program is employed to control operation of the computer system as a whole, and in particular, to establish priority among the users and to invoke various process modules to perform work for those users.

When a user obtains access to, or logs on, a multiprogramming/multiprocessing computer system, the control program assigns that user a group of addressable memory blocks which together form a unit referred to as a control block, in which are stored local variables, references to program procedures, data arrays and current process status. The control program performs a process on behalf of a particular user in accordance with instructions from that user, and with instructions that may be stored in the control program. While conducting a particular process, the control program may access the control block, which was established on behalf of that user, several times, for instance, to temporarily store data, to receive data, and to receive specific instructions. When a user releases access to, or logs off, the computer system, the memory blocks that were assigned to the control block representing that user are released and become available for a subsequent assignment to a new user.

When multiple users are simultaneously employing a single computer system, each user is represented to the control program by a respective control block, and the control program invokes the process modules to control operation of the computer system and to perform services for the control blocks. Typically, at any one point in time, only one process module is operating, and that module is servicing only one control block; and when that process module completes its operation, another process module is called upon to service that one, or another, control block. Occasionally, operation of a first process module that is servicing a first control block will be temporarily interrupted or suspended, for example, while data is being transferred into that first control block. To improve the performance of the computer system as a whole, during such a temporary interruption of a process module, the control program may call upon a second process module to service a second control block. When the operation of the second process module is completed, the control of the computer system is returned to the first process module and operation of this process module may resume.

It is very possible that the user represented by the first control block might have logged off the computer system while the second process module was controlling operation of that system; and, in this case, the memory blocks forming the first control block are reassigned to the main memory of the computer system. The first process module may not know that the first control block has been released; and the first process module may resume operation and alter data in, add data to, or delete data from the memory blocks that formed the first control block This may result in an undesirable overlaying of data in those memory blocks There are two procedures to prevent this overlaying of data. One procedure is to program each process module to re-scan all of the control blocks each time an interrupted process module resumes control of the computer system. If the particular control block with which the process module was working, remains formed, the process module resumes operation. However, if the scan shows that the particular control block, with which the process module was working, has been released, the process module does not resume operation, and, for example, control of the computer system may be returned to the control program. This procedure is relatively time consuming, however, especially if there are many control blocks on the computer system.

Another technique to prevent the above-discussed data overlay is to employ a locking procedure. For example, when a process module is temporarily interrupted, the particular control block with which that module was working, is locked so that other processes, and in particular a log off process, cannot access that particular control block. In this way, the interrupted process module can be sure that the log off process will not release that particular control block. A major disadvantage to this technique is that it also reduces wanted or desired access to the control block while operation of the interrupted process module is suspended, reducing system performance. Further, this procedure usually requires that a list of locks be formed, and that all the process modules of the computer systems scan that whole list before accessing a particular control block.

SUMMARY OF THE INVENTION

An object of this invention is to provide a multiprogramming/multiprocessing computer system with a data field to show whether selected control blocks, which represent users of the system, have been released Another object of the present invention is to establish a control block monitor data field in a multiprocessing/multiprogramming computer system to indicate whether control blocks, which represent users of the system, have been released; and if there is a temporary interruption in the operation of a process module that is servicing a particular control block, to check the monitor data field to determine whether that particular control block remains established before resuming operation of the interrupted process module.

These and other objectives are attained with a method of monitoring transient data structures in a computer system of the type wherein a plurality of users selectively obtain and release access to the computer system. The computer system includes a plurality of control blocks, and each control block is established when a user obtains access to the computer system and is released when the user releases access to the computer system. The computer system further includes a control program to control operation of the computer system, and to establish priority among the users, and the control program has a plurality of process modules to perform services for the users.

The method comprises the steps of invoking one of the process modules to service one of the control blocks, and temporarily suspending operation of that one process module and invoking another of the process modules to control operation of the computer system. A control block monitoring data field is established for that one control block and is used to indicate whether that control block remains established. The method further comprises the steps of passing control of the computer system from the other process module back to said one process module, and searching the control block monitoring data field to determine whether that one control block remains established. If that control block remains established, operation of the interrupted process module is resumed; however, if the one control block does not remain established, control of the computer system is passed from the one process module to the control program.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
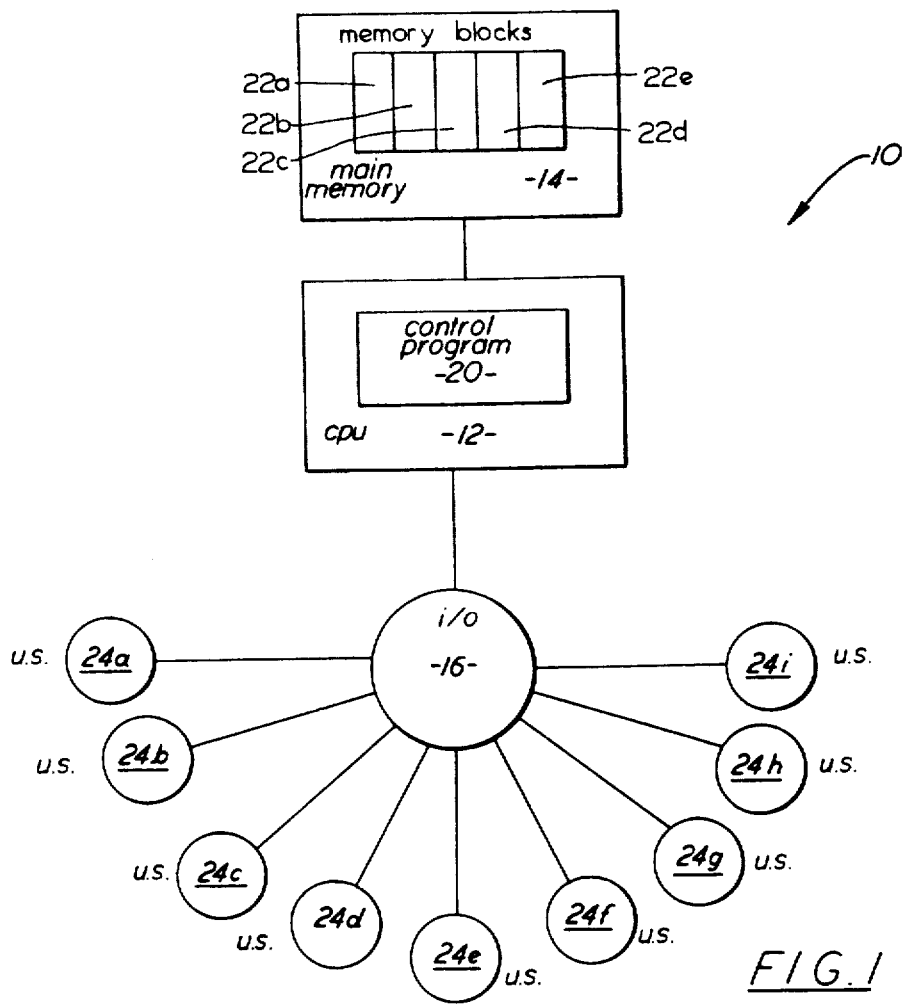
FIG. 1 is a block diagram illustrating a computer system according to this invention.

FIG. 1 schematically shows computer system 10 comprising central processing unit 12, main memory unit 14 and input-output means 16. Central processing unit 12 includes a control program 20 which is designed to control the overall operation of the computer system. Main memory unit 14 is connected to the central processing unit so that data can be transferred between the main memory unit and the central processing unit and the main memory unit includes a multitude of addressable memory blocks that may be used to FIG. 1 at blocks 22a-e, although a conventional main memory unit might include thousands of addressable memory blocks. Input-output means 16 is connected to the central processing unit to connect computer system 10 to a multitude of user those user stations. These user stations are represented in FIG. 1 by blocks 24a-i, although the computer system may be designed to work with scores of user stations. In a conventional manner, each user station is adapted to log on and to log off the computer system—that is, to obtain and to release access, respectively, to the computer system.

Figure 2:
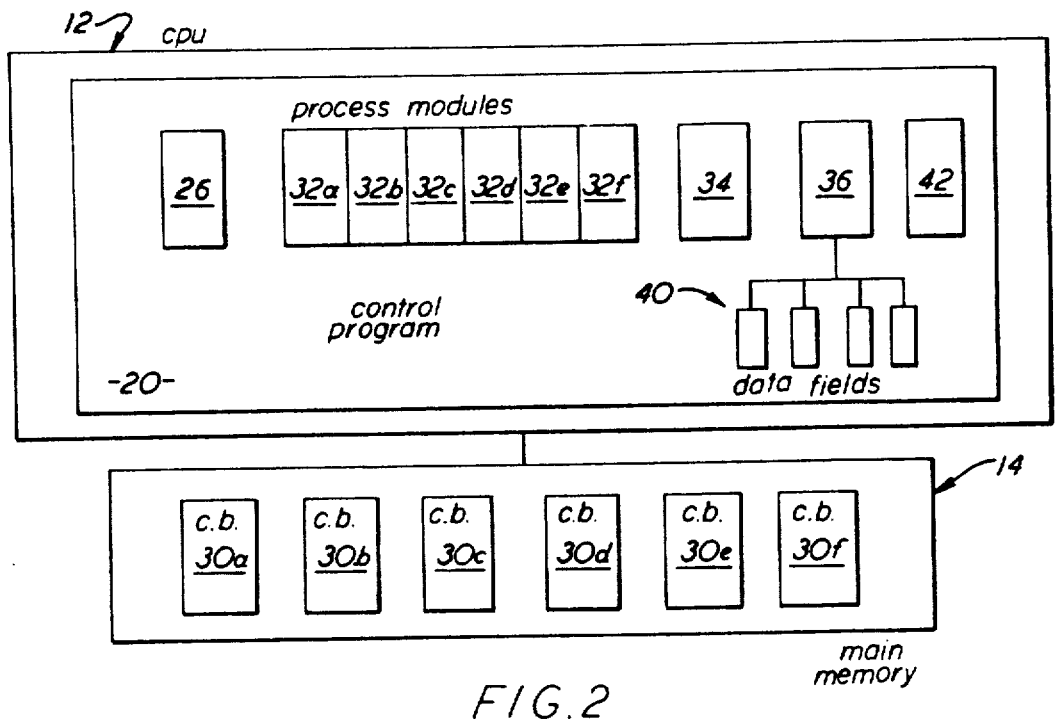
FIG. 2 is a block diagram showing various parts and structures of the computer system in greater detail.

With reference to FIG. 2, control program 20 includes means 26 to establish a control block each time a user station obtains access to the computer system and to release the control block when that user station releases access to the computer system. A control block is formed or established by locking or assigning a group of addressable memory blocks for the exclusive use of a particular user, and a control block is released by releasing the memory blocks of that control block from that exclusive use for the particular user so that these memory blocks may be used for other purposes in system 10. Thus, each control block represents one of the users of computer system 10. FIG. 2 shows six such control blocks 30a-f, although the computer system may be, and preferably is, designed to accommodate scores of control blocks at any given time Control program 20 also includes a plurality of process modules 32a-f to service the control blocks, and in particular, to process data for or with those control blocks according to preset programs FIG. 2 shows six process modules; however, the control program may, and preferably does, have many more such process modules.

Sub unit 34 of the control program is provided to establish priority among the users of system 10, and to invoke the process modules to control operation of the computer system and to service the control blocks Typically, at any one point in time, only one of the process modules is operating, and that module is servicing only one of the control blocks; and when that process module completes its operation, another process module is called upon to service that one, or another, control block. Occasionally, operation of a first process module that is servicing a first control block may be temporarily interrupted or suspended, and during such a temporary interruption, the control program may invoke a second process module to service that first or a second control block. When this second process module completes its operation, the first process module resumes its operation.

The sequence of interrupting the operation of one process module and invoking another process module may be repeated a number of times so that a plurality of process modules may all be in a suspended state at the same time. For instance, operation of a first process module may be suspended and a second process module invoked; and, while that first process module is suspended, the second process module may also be suspended and a third process module invoked. These invoked process modules may service the same or different control blocks Under these conditions, when a particular process module completes its operation, control of the computer system passes back to one of the suspended process modules, usually the most recently suspended one. The suspended process modules resume operation one by one until they have all completed their operations In accordance with the present invention, a unique arrangement is provided to insure that the control block that was being serviced by a suspended process module, is still formed before that suspended process module resumes operation. To accomplish this, control program 20 is provided with means 36 to establish a plurality of control block monitor data fields or units 40 Each suspended process module is associated with a control block monitor unit and each of these monitor units includes means to indicate whether the control block, which was being serviced by the associated process module, remains formed The control program further includes means 42 to check the control block monitor unit associated with a suspended process module when control of the computer system is returned to that suspended process module, to determine whether the particular control block, which was being serviced by the particular process module, remains formed If that particular control block remains formed, the suspended process module resumes operation; however, if that particular control block had been released while operation of the process module had been suspended, the control program terminates operation of that process module and the operation of the computer system continues further in accordance with the control program.

Preferably, each control block monitor unit has a unique address, and that address is added to the process module associated with the monitor unit when that unit is established. In addition, when a control block monitor unit is established, its address may also be added to the control block being monitored by that monitor unit. With this arrangement, if a user station transmits a request to log off, or to release access to, computer system 10, the control block representing that user is searched for an address of a control block monitor unit; and if such an address is found, that monitor unit itself is found and changed to indicate that the control block has been released. Preferably, a control block monitor unit is established when a process module is invoked to service a control block, and the monitor unit monitors that particular control block. Also, when a process module completes its operation, it is desirable to release the control block monitor unit with which the process module was associated. When a monitor unit is released, the memory blocks forming that unit are released from the exclusive use for that memory unit so that these memory blocks may be used by the computer system for other purposes.

Each control block monitor unit may consist of a 32 bit data field. The first bit in the field may be used to show whether the control block, which is being monitored by the monitor unit, remains established, and the remaining 31 bits in the data field may be used to hold the address of another monitor unit, for purposes discussed in greater detail below. For instance, the first bit in the data field may be set to 0 as long as the monitored control block remains established, and changed to 1 if that monitored control block is released.

Figure 3:
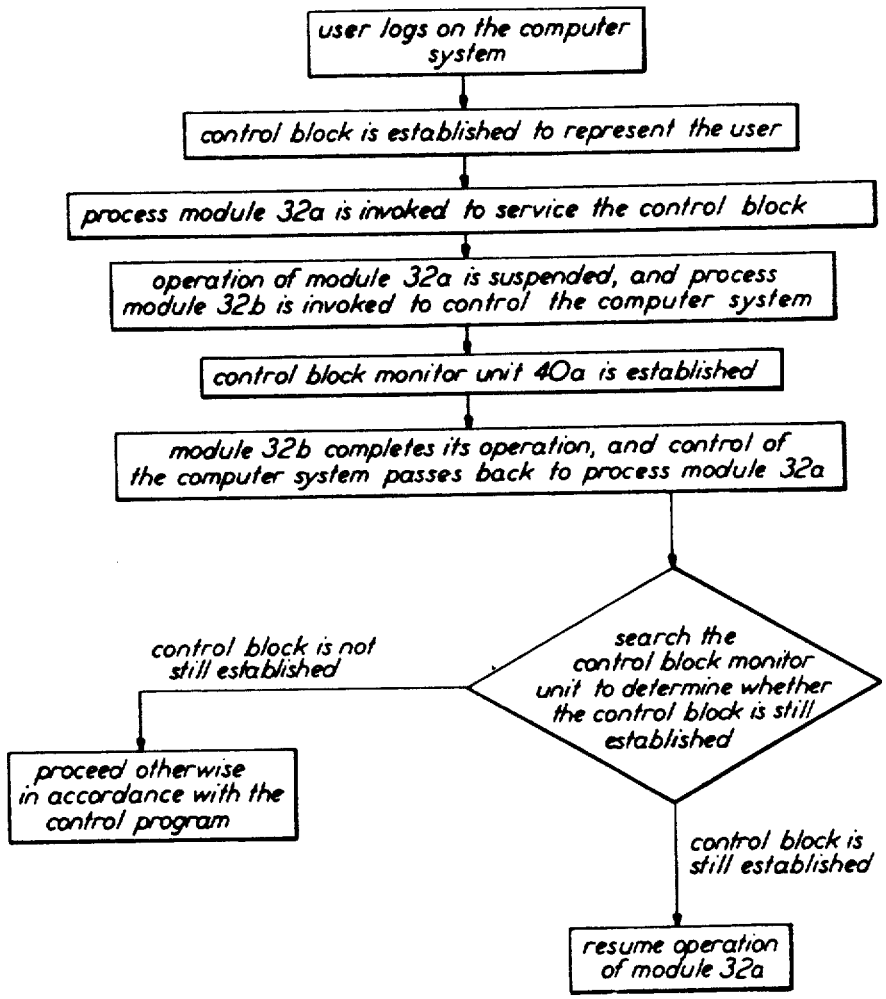
FIG. 3 is a flow chart illustrating one application of this invention.
Figure 4:
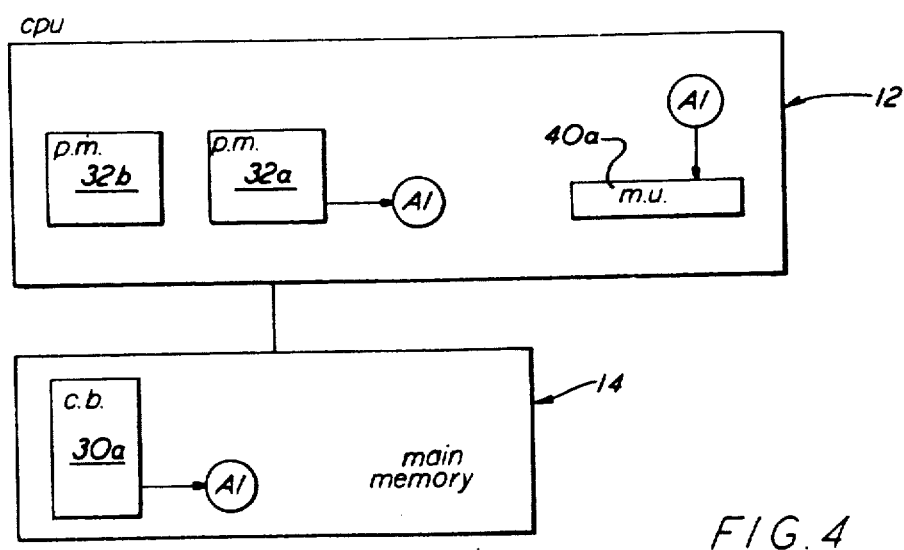
FIG. 4 shows several parts and structures of the computer system used in the application illustrated in FIG. 3.

FIG. 3 illustrates one application of the present invention, and FIG. 4 schematically depicts the data structures of computer system 10 employed during this application. After a user logs on the computer system and control block 30a is established to represent that user, process module 32a is invoked to service that control block. Operation of this process module is temporarily suspended and another process module 32b is invoked to control operation of the computer system. This other process module may be invoked to service control block 30a or another control block on the computer system A control block monitor unit 40a is established to indicate whether control block 30a remains established. After process module 32b completes its operation, control of the computer system is passed back to process module 32a; however, before this module resumes operation, control block monitor unit 40a is searched to determine whether control block 30a is still established at this time. If the control block is still established, operation of process module 32a resumes; but if control block 30a is not still established at the time the control block monitor unit 40a is searched, process module 32a does not resume operation and instead the computer system proceeds otherwise in accordance with the control program.

Preferably, control block monitor unit 40a is established when process module 32a is invoked, and the monitor unit is released either when operation of that process module is completed, or when operation of the process module is otherwise terminated by the control program. In addition, it is desirable to provide monitoring unit 40a with an address A1 identifying its location in the computer system, and to identify this address in process module 32a. With this arrangement, when control of the computer system passes back to process module 32a after a temporary interruption in the operation of that process module, the module unit 40a is found by first searching the process module for the address of that monitoring unit.

It is also desirable to identify the address of monitoring unit 40a in control block 30a. When the user represented by control block 30a, logs off the computer system, control block 30a is searched for the address of any monitoring unit; and if such an address is found, that monitoring unit is found and it is changed to show that the control block has been released.

Figure 5A:
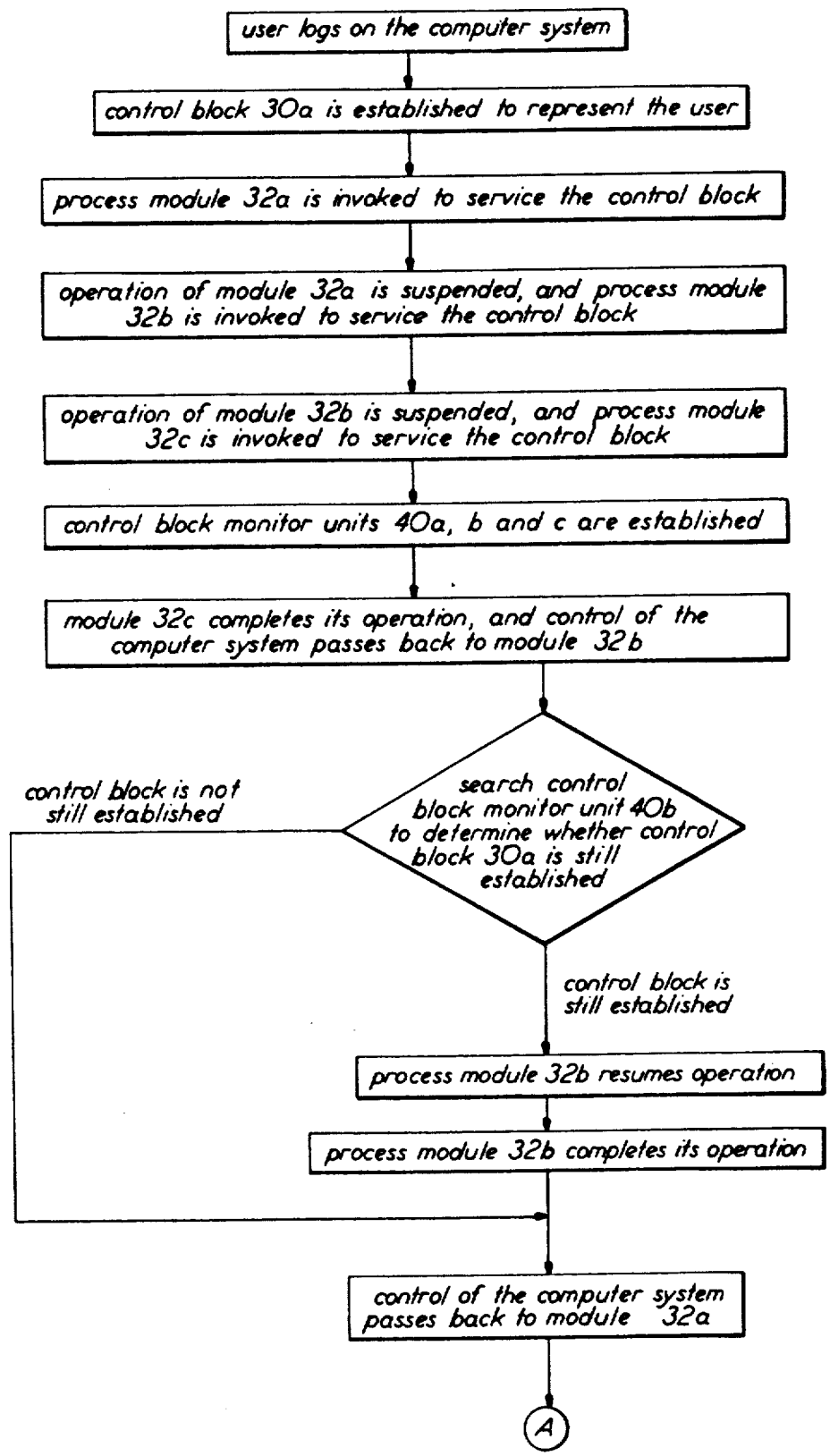
FIGS. 5A and 5B illustrate a second application of the present invention.
Figure 5B:
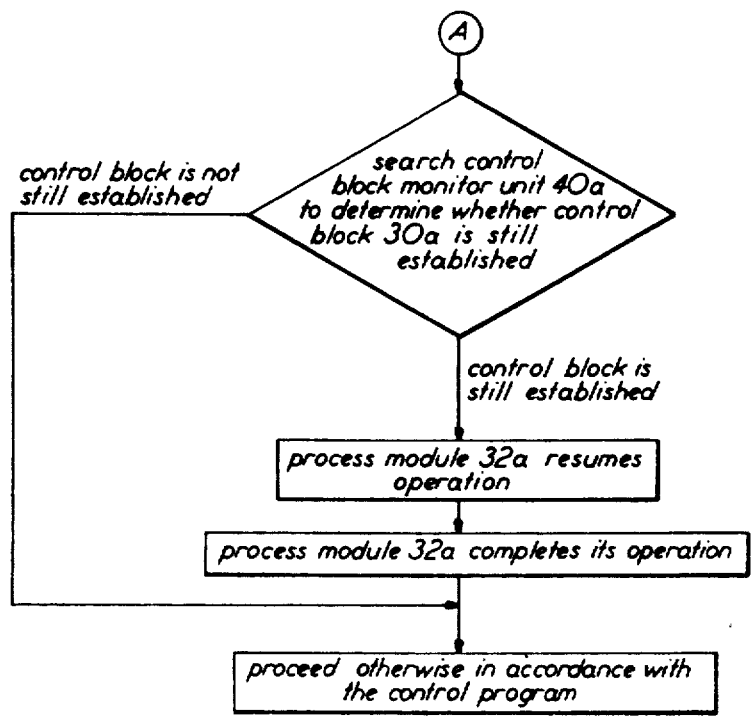
Figure 6:
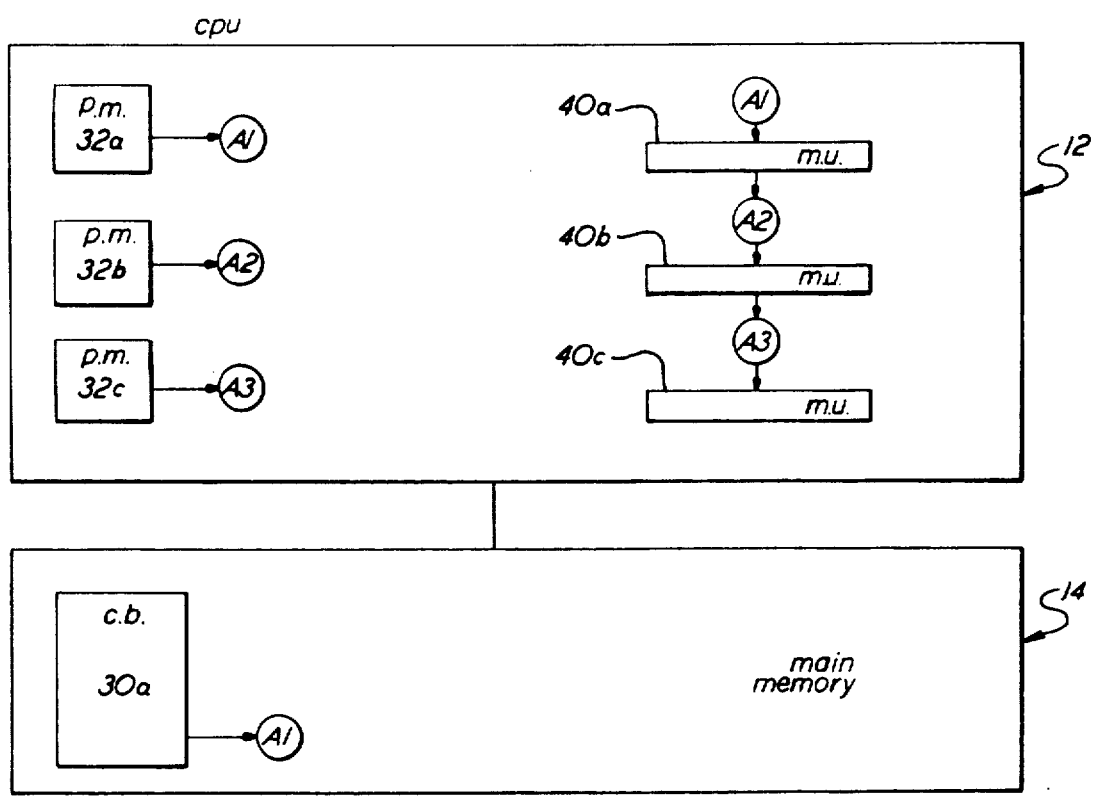
FIG. 6 shows various parts and structures of the computer system used in the application illustrated in FIGS. 5A and 5B.

FIGS. 5A and 5B illustrates a second application of the present invention, where a group of process modules are invoked in series to service the same control block, and FIG. 6 shows the structure of the computer system used during this application. After a user logs on the computer system and control block 30a is established to represent that user, process module 32a is invoked to service that control block. Operation of process module 32a is temporarily suspended and process module 32b is invoked to service control block 30a; and subsequently, operation of process module 32b is temporarily suspended and a third process module 32c is invoked to service the control block A control block monitor unit 40a, 40b, 40c is established for each process module 32a, 32b, 32c, respectively, and each of these monitoring units shows whether control block 30a remains established. Preferably, each monitoring unit is established when the associated process module is invoked, although the monitor units may be established at other times.

After process module 32c completes its operation, control of the computer system passes back to process module 32b; but before module 32b resumes operation, monitoring unit 40b is checked to determine whether control block 30a remains established. If control block 30a remains established, process module 32b resumes operation; and upon completion of the operation of this process module, control of the computer system passes back to process module 32a. If, however, control block 30a is not still established when control of the computer system passes back to process module 32b, this process module immediately passes control of the computer system back to process module 32a. Once control of the computer system passes back to process module 32a, monitoring unit 40a is searched to determine whether control block 30a still remains established. If the control block is still established, process module 32a resumes operation; however, if control block 30a is not still established at this time, process module 32a does not resume operation, and the computer system proceeds otherwise in accordance with control program 20.

Preferably, each monitoring unit has an address and the address of each monitoring unit is provided in the process module associated with the monitoring unit. With the application depicted in FIGS. 5A and 5B, the address of the first monitoring unit 40a established for control block 30a is also added to that control block. The address of the second monitoring unit 40b established for control block 30a is located in the first monitoring unit 40a, and the address of the third monitoring unit 40c is located in the second monitoring unit 40b. In this way, the monitoring units 40a, b and c established for a particular control block form a chain, with the control block pointing to a first monitoring unit in this chain and each monitoring unit in the chain, except the last one, pointing to a next subsequent monitoring unit in the chain.

If the user represented by control block 30a, logs off the computer system, control block 30a is searched for the address of any monitoring unit, and if such an address is found, the monitoring unit is found and changed to show that the control block has been released. Then, this monitoring unit is searched for the address of any other monitoring unit, and, if such an address is found, that other monitoring unit is then found and changed to show that the control block has been released. This sequence of events—searching a monitoring unit for an address of a next monitoring unit, finding that next monitoring unit and changing the latter monitoring unit to show that the control block has been released—continues until all the monitoring units in the chain established for a particular control block have been changed to indicate that the control block has been released. Preferably, the last monitoring unit in a chain includes means indicating this fact—that it is the last one in the chain—so that once this last monitor unit has been found, further searching for additional monitoring units is not done.

Figure 7A:
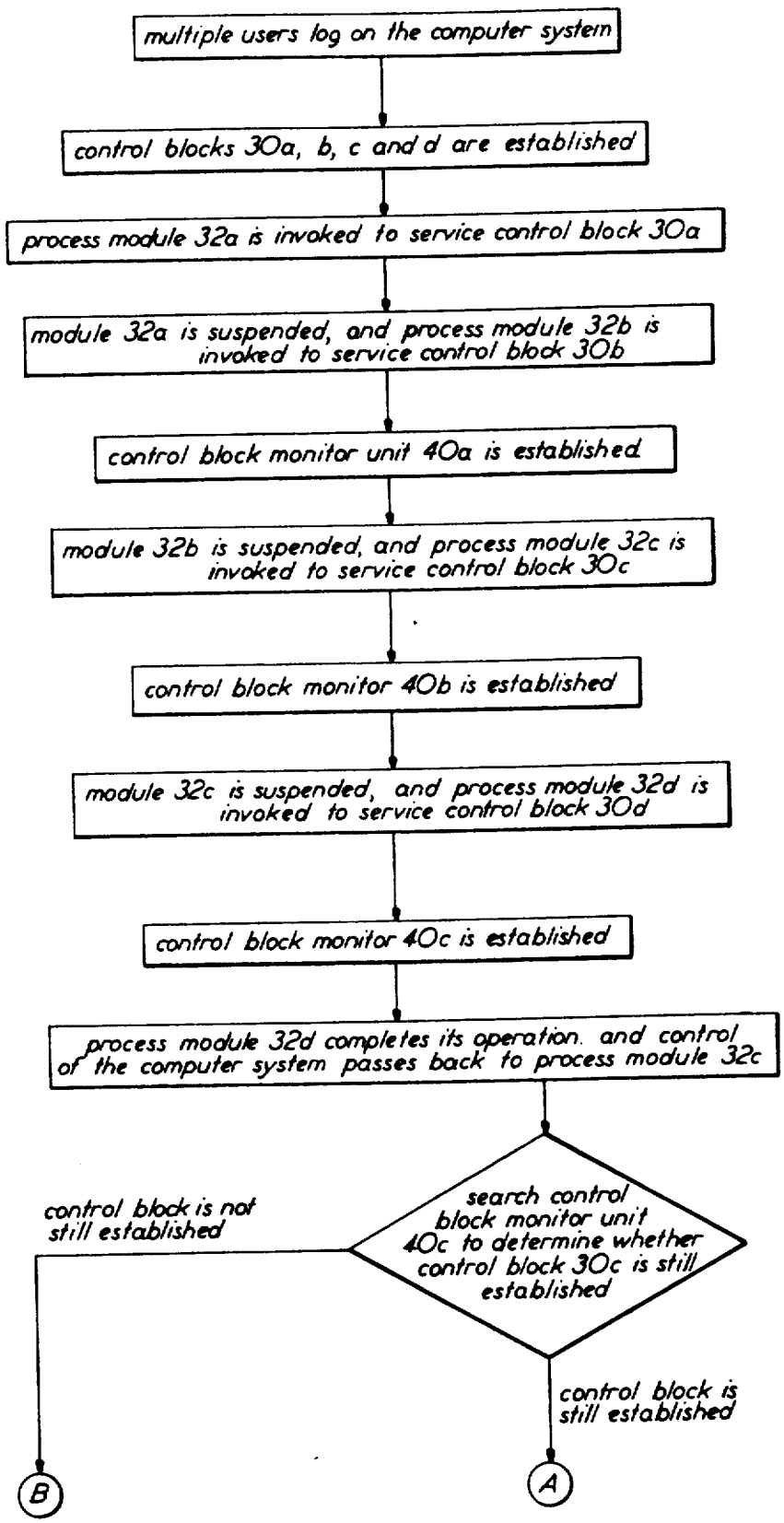
FIGS. 7A and 7B show a third application of the present invention.
Figure 7B:
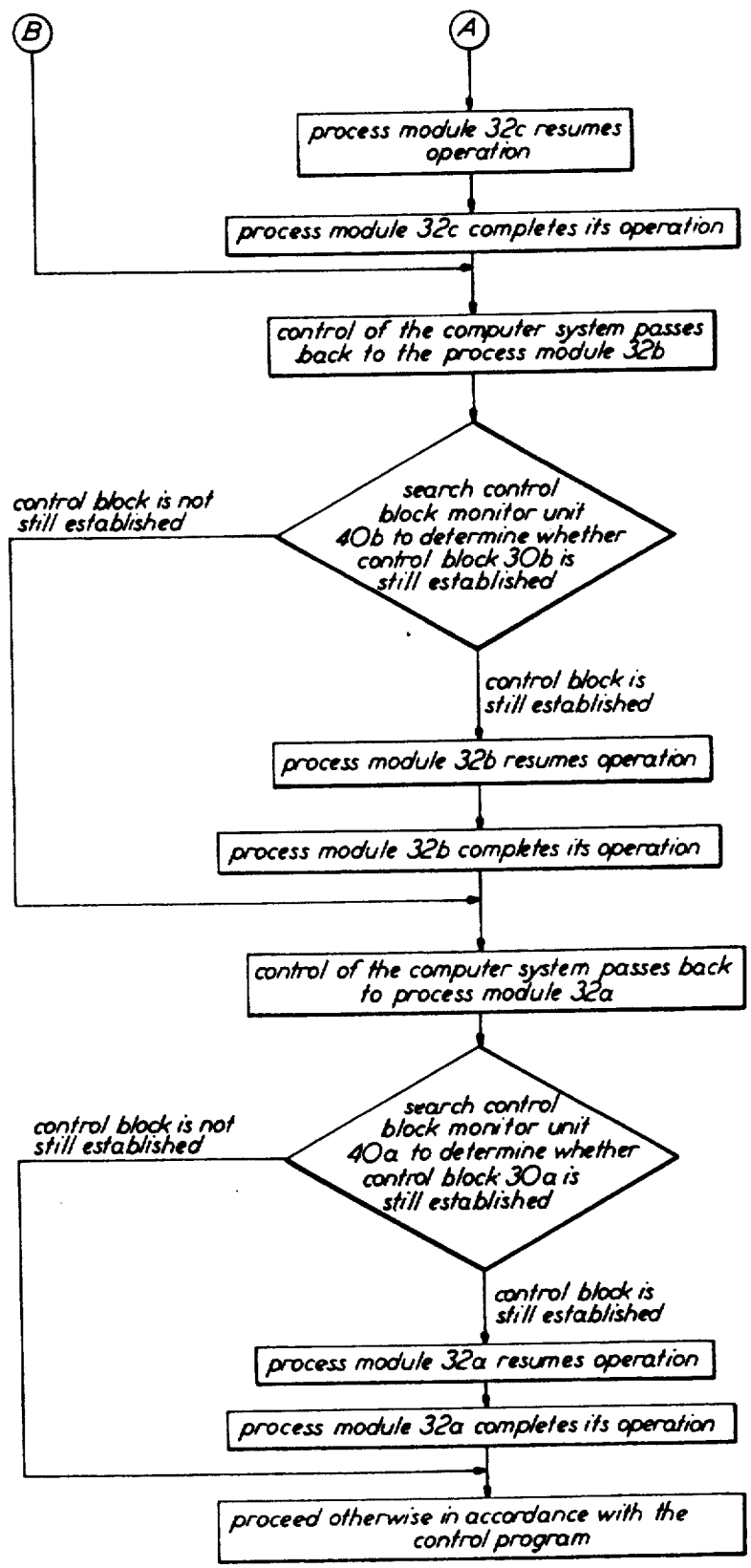
Figure 8:
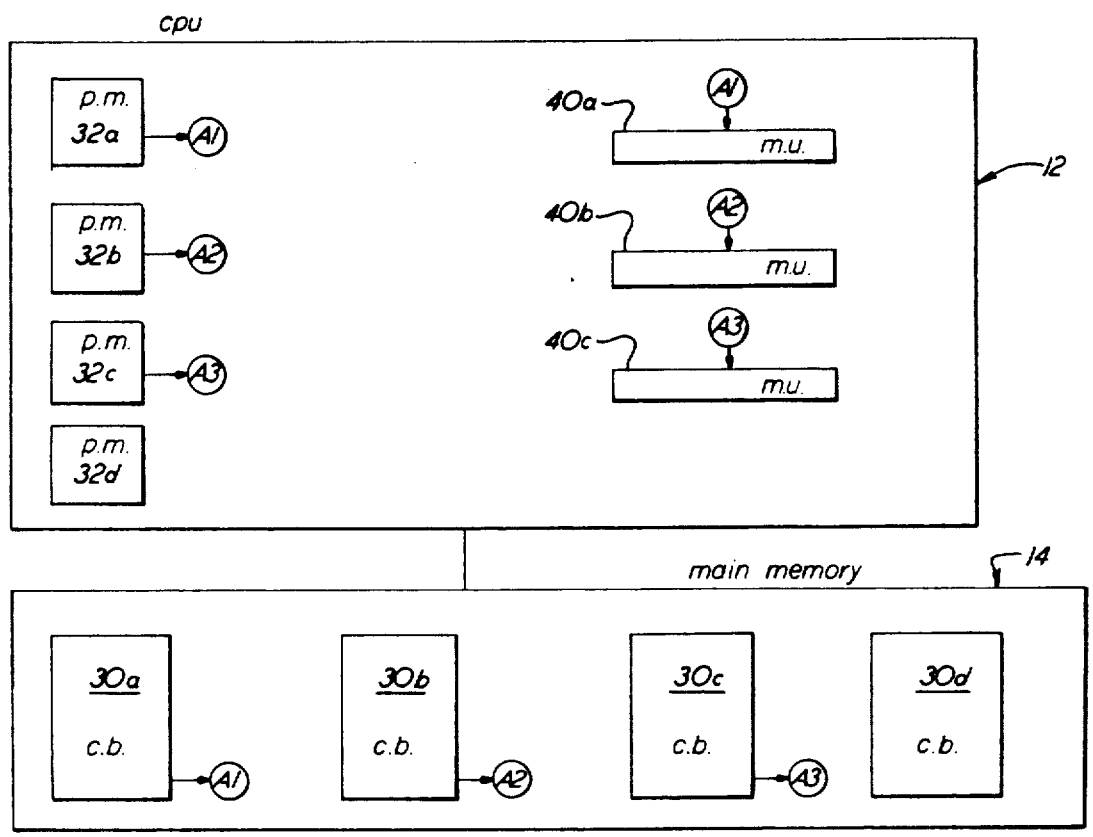
FIG. 8 depicts several parts and structures of the computer system used in the application shown in FIGS. 7A and 7B.

FIGS. 7A and 7B illustrates a third application of this invention, where a group of process modules are invoked to service different control blocks, and FIG. 8 depicts the structure of the computer system used in this operation. A multitude of users log on the computer system, and a multitude of control blocks are established, with each control block representing a respective one of the users. Control program 20 determines which user receives priority, and invokes process modules 32a to service control block 30a. After a while, operation of this process module is temporarily suspended, and process module 32b is invoked to service control block 30b. Control block monitor unit 40a is established to indicate whether control block 30a remains established; and, while process module 32a is suspended, control block 30a is monitored and if it should be released, monitoring unit 40a is changed to reflect this. Preferably, monitoring unit 40a has an address identifying its location in the computer system, and this address is added both to process module 32a and to control block 30a.

After process module 32b has been operating for awhile, this process module is temporarily suspended, and the control program invokes a third process module 32c to service a third control block 30c. Control block monitoring unit 40b is established to show whether control block 30b remains established; and, while process module 32b is suspended, control block 30b is monitored, and if it should be released, monitoring unit 40b is changed to show this. Preferably, monitoring unit 40b also has an address identifying its location in the computer system and this address is added both to the process module 32b and to control block 30b.

With the method illustrated in FIGS. 7A and 7B, after process module 32c has been operating for awhile, it is temporarily suspended and the control program invokes a fourth process module 32d to service a fourth control block 30d. Control block monitor 40c is established to show whether control block 30c remains established; and, while process module 32c is suspended, control block 30c is monitored and if it should be released, monitoring unit 40c is changed to show this. Preferably, monitoring unit 40c has an address identifying its location in the computer system and the address of this monitoring unit is added to process module 32c and to control block 30c.

After process module 32d completes its operation, control of the computer system returns to process module 32c. At this time, monitoring unit 40c is checked to determine L whether control block 30c is still established; and if the control block is not still established, then control of the computer system passes to process module 32b. If, though, control block 30c is still established, process module 32c resumes and completes its operation, and then passes control of the computer system back to second process module 32b.

After control of the computer system passes back to process module 32b, monitoring unit 40b is checked to determine whether control block 30b is still established. If control block 30b is not still established, control of the computer system passes to process module 32a. However, if control block 30b is still established when monitoring unit 40b is checked, process module 32b resumes and completes its operation, and then passes control of the computer system to process module 32a.

Once process module 32a re-obtains control of the computer system, monitoring unit 40a is checked to determine if control block 30a remains established at this time. If it is still not established, process module 32a does not resume operation, and the computer system continues to operate further in accordance with the control program. If, though, control block 30a is still established when process module 32a re-obtains control of the computer system, process module 32a resumes and completes its operation, after which the computer system further operates according to the control program.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. In a computer system comprising a central processing unit, a memory unit, and input-output means, the central processing unit being connected to the memory unit to transmit data between the central processing unit and the memory unit, the input-output means being connected to the central processing unit to transmit data between the central processing unit and a multitude of user stations, the central processing unit including a control program to control operation of the computer system, to establish priority among the user stations and having a plurality of process modules to perform services for the user stations, wherein the user stations selectively obtain and release access to the computer system, each time one of the user stations obtains access to the computer system, the control program establishes in the computer system a respective one control block associated with said one user station, and the control program releases each control block from the memory unit when the user station associated with the control block releases access to the computer system, a method of operating the computer system comprising the steps of:

the computer system,
i) invoking one of the process modules to service one of the control blocks,
ii) suspending operation of said one process module and invoking another of the process modules to control operation of the computer system,
iii) establishing in the computer system a control block monitoring data field for said one control block,
iv) indicating in said control block monitoring data field whether said one control block remains established,
v) passing control of the computer system from said other process module back to said one process module,
vi) searching the control block monitoring data field to determine whether said one control block remains established,
vii) if said control block remains established, the computer system resuming operation of said one process module, and
viii) if said one control block does not remain established, the computer system taking control of the computer system away from said one process module.

2. A method according to claim 1, further including the steps of:

the computer system,
ix) assigning an address to the control block monitoring data field identifying the location of the control block monitoring data field in the computer system, and
x) identifying the address of the control block monitoring data field, in the one process module; and
wherein the searching step includes the step of searching the one process module for the address of the control block monitoring data field.

3. A method according to claim 1 further including the step of the computer system, releasing the control block monitoring data field after the searching step.

4. A method according to claim 1 further including the steps of:

the computer system,
ix) assigning an address to the control block monitoring data field identifying the location of the control block monitoring data field in the computer system, and
x) identifying the address of the control block monitoring data field in said one control block; and
wherein the indicating step includes the step of,
if said one control block is released, searching said one control block for the address of the control block monitoring data field.

5. A method according to claim 1, wherein the establishing step includes the step of establishing said control block monitoring data field when the one process module is invoked.

6. A method of operating a computer system comprising a central processing unit, a memory unit, and input-output means, the central processing unit being connected to the memory unit to transmit data between the central processing unit and the memory unit, the input-output means being connected to the central processing unit to transmit data between the central processing unit and a multitude of user stations, the central processing unit including a control program to control operation of the computer system, to establish priority among the user stations, and having a plurality of process modules to perform services for the user stations, wherein the user stations selectively obtain and release access to the computer system, the method comprising the steps of:

the computer system,
i) establishing a plurality of control blocks in the memory unit of the computer system, each control block being established when one of the user stations obtain access to the computer system and being release when said one user station releases access to the computer system,
ii) involving the process modules to service the control blocks, each invoked process module controlling operation of the computer system and being invoked to service one of the control blocks,
iii) suspending operation of one of the process modules and invoking another of the process modules to control operation of the computer system,
iv) repeating step (iii) a plurality of times,
v) establishing a plurality of control block monitoring data fields in the computer system, each suspended process module being associated with a respective one of the control bock monitoring data fields,
vi) indicating in the control block monitoring data field associated with each suspended process module, whether the control block being serviced by the suspended process module at the time operation thereof was suspended, remains established,
vii) returning control of the computer system from one of the process modules to one of the previously suspended process modules,
viii) repeating step vii) a plurality of times,
ix) after each time control of the computer system is returned to one of the previously suspended process modules,
1) searching the control block monitoring data field associated with said one of the previously suspended process modules to determined whether the one control bock being serviced by said one of the previously suspended process modules at the time operation thereof was suspended, remains established,
2) if said one control bock remains established, resuming operation of said one of the previously suspended process modules, and
3) if said one control block does not remain established, the computer system taking control of the computer system away from said one of the previously suspended process modules.

7. A method according to claim 6, further including the steps of:

the computer system further,
x) assigning an address to each control block monitoring data field identifying the location of the control block monitoring data field in the computer system, and xi) identifying in each suspended process module, the address of the control bock monitoring data field associated therewith; and wherein the searching step includes the step of searching the suspended process module for the address of the associated control bock monitoring data field.

8. A method according to claim 7, further including the step of, after control of the computer system has bene returned to one of the previously suspended process modules, (xii) the computer system releasing the control block monitoring data field associated with said one of the previously suspended process modules.

9. A method according to claim 6, further including the steps of the computer system x) assigning an address to each control block monitoring data field identifying the location of the control block monitoring data field in the computer system, and xi) for each suspended process module, identifying the address of the control block monitoring data field associated with the suspended process module, in the one control block being serviced by the suspended process module at the time operation thereof was suspended;

the indicating step including the step of, when each control block is released, searching the control block for the address of one of the control block monitoring data fields.

10. A method according to claim 6, wherein the step of establishing a plurality of control bock monitoring data fields includes the step of establishing a respective one control block monitoring data field each time a process module is invoked.

11. A method according to claim 6, wherein:

the step of invoking the process modules includes the step of invoking a group of process modules to service a selected one of the control blocks, step (iii) includes the step of suspending operation of each of the group of process modules, the group of process modules being associated with a group of control block monitoring data fields;

further including the steps of:

the computer system, x) assigning an address to each control block monitoring data field identifying the location of the control block monitoring data field in the computer system, xi) arranging the group of control block monitoring data fields in a chain, xii) identifying in the selected control block, the address of a first control block monitoring data field in the chain, and xiii) identifying the address of each control block monitoring data field in said chain, other than said first control block monitoring field in said chain, in an immediately preceding control block monitoring data field in the chain.

12. A multiprogramming and multiprocessing computer system, comprising:

a central processing unit including a control program to control operation of the computer system;

a main memory unit connected to the central processing unit to transmit data between the central processing unit and the main memory unit, and including a multitude of addressable memory blocks; and input-output means connected to the central processing unit to connect the computer system to, and to transmit data between the computer system and, a multitude of user stations, each user station having means to obtain and to release access to the computer system;

the computer system further including i) means to form a group of the addressable memory blocks into a control block each time one of the user stations obtains access to the computer system and to release the group of addressable memory blocks of one of the control blocks when the user station, for which said one control block is formed, releases access to the computer system, ii) a plurality of process modules, iii) means to establish priority among the user stations, and to invoke the process modules to control operation of the computer system and to service the control blocks, wherein each time a process module is invoked, the process module services one of the control blocks, iv) means to suspend operation of each of the process modules and to subsequently return control of the computer system to previously suspended process modules, ·v) means to establish in the computer system, a control block monitor data field associated with each suspended process module, the control block monitor data field including means to indicate whether the control block which was being serviced by the associated process module, remains formed, vi) means to check the control block monitor data field associated with a given suspended process module when control of the computer system is returned to the given suspended process module, to determine whether the control bock, which was being serviced by the given suspended process module, remains formed, and viii) means to terminate operation of the given suspended process module if the control block, which was being serviced by the given suspended process module, has bene released.

13. A computer system according to claim 12, wherein each control block monitor data field has an address, and the means to check the control block monitor data field associated with a suspended process module includes means to hold the address of the control block monitor data field.

14. A computer system according to claim 13, wherein:

the means to establish a control block monitor data field associated with each suspended process module includes means to lock groups of memory blocks for exclusive use as control block monitor data fields; and the computer system further includes means to release each group of memory blocks from exclusive use as one of the control block monitor data fields.

15. A computer system according to claim 14, wherein the means to release each group of memory blocks includes means to release each group of memory blocks from exclusive use as one of the control block monitor data fields upon termination of the operation of the one process module associated with said one of the control block monitor data fields.

* * * * *

UNITED STATES PATENT AND TRADEMARK OFFICE
CERTIFICATE OF CORRECTION

PATENT NO. : 5,129,087
DATED : July 7, 1992
INVENTOR(S) : Robert C. Will It is certified that error appears in the above-identified patent and that said Letters Patent is hereby corrected as shown below:

Column 2, line 50: after "released" insert --.--

Column 3, lines 62-63: "to Fig. 1 at blocks 22a-e, although" should read as --to hold data. The addressable memory blocks are represented in Figure 1 at blocks 22a-e, although--

Column 3, line 67: "user those user stations" should read as --user stations to transfer data between the computer system and those user stations--

Column 4, line 21: after "time" insert --.--
Column 4, line 25: after "programs" insert --.--
Column 4, lines 31 & 55: after "blocks insert --.--
Column 4, line 61: after "operations" insert --.--
Column 4, line 68: after "40" insert --.--
Column 5, lines 5 & 11: after "formed" insert --.--
Column 5, line 63: after "system" insert --.--
Column 6, line 42: "block A" should read as --block. A--
Column 6, line 65: "30astill" should read as --30a still--
Column 7, line 22: "foun" should read as --found--
Column 7, line 65: "40bis" should read as --40b is--

UNITED STATES PATENT AND TRADEMARK OFFICE
CERTIFICATE OF CORRECTION

PATENT NO. : 5,129,087

DATED : July 7, 1992

INVENTOR(S) : Robert C. Will

It is certified that error appears in the above-identified patent and that said Letters Patent is hereby corrected as shown below:

Column 8, line 21:   delete "L"

Column 10, line 23, Claim 6:  "involving"  should read as --invoking--

Column 10, line 50, Claim 6:  "determined"  should read as --determine--

Column 10, lines 51 & 55, Claim 6:  "bock"  should read as --block--

Column 11, line 6, Claim 7:  "bock"  should read as --block--

Column 11, line 10, Claim 8:  "bene"  should read as --been--

Column 11, line 33, Claim 10:  "bock"  should read as --block--

Column 12, line 38, Claim 12:  "bock"  should read as --block--

UNITED STATES PATENT AND TRADEMARK OFFICE
CERTIFICATE OF CORRECTION

PATENT NO. : 5,129,087
DATED : July 7, 1992
INVENTOR(S) : Robert C. Will

It is certified that error appears in the above-indentified patent and that said Letters Patent is hereby corrected as shown below:

Column 12, line 44, Claim 12" "bene" should read as --been--.

Signed and Sealed this

Twenty-eighth Day of September, 1993

Attest:

BRUCE LEHMAN

*Attesting Officer*   *Commissioner of Patents and Trademarks*